July 8, 1930.  E. W. DAVIS  1,770,071
LUBRICATING MEANS
Filed Aug. 9, 1926   2 Sheets-Sheet 2
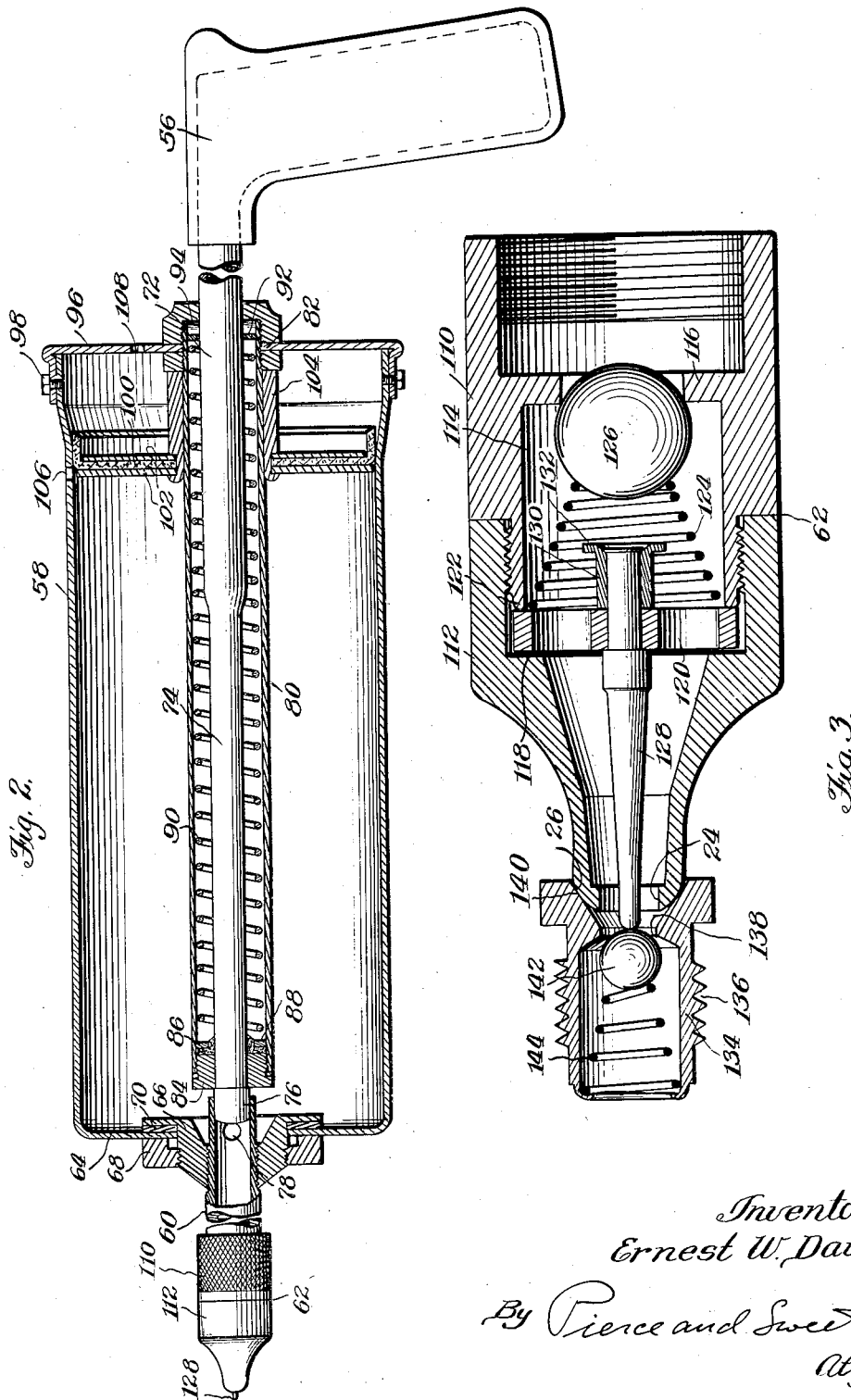

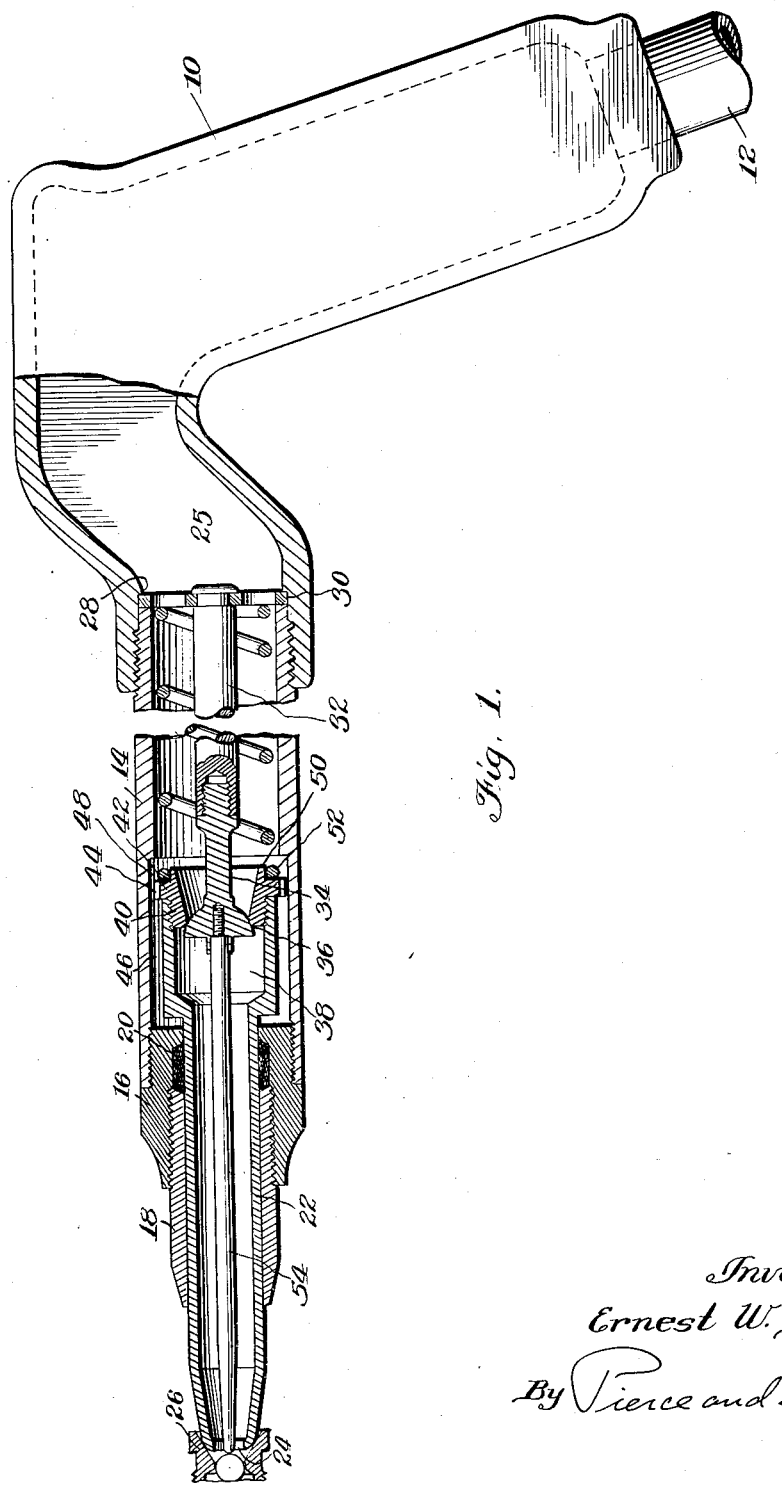

Patented July 8, 1930

1,770,071

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING MEANS

Application filed August 9, 1926. Serial No. 128,186.

My invention relates to lubrication, and more specifically to improved means for injecting lubricant into bearings requiring a relatively large amount of lubricant and capable of receiving the same at relatively moderate pressures.

Among the objects and advantages of the invention may be enumerated:

First, to improve the coupling means to provide a perfect coupling seal when both coupled and uncoupled, along with a minimum of resistance to flow when coupled.

Second, to provide a gun of relatively large capacity, and convenient and quick means for filling the same through the discharge outlet by some other power driven filling means. An item of novelty and convenience in connection with this object is the use of a unitary coupling and check valve assembly readily detachable from the discharge tube of the gun. Another convenient feature in connection with the filling operation is the provision of an air vent that functions both as an indicator and as a safety relief outlet.

Third, to provide a very compact structural embodiment of lubricant compressor, having movable parts of minimum inertia. An item of novelty in connection with this object is the use of a return spring housed within the geometric contour of the gun barrel itself.

Fourth, to eliminate the necessity for any very precise alignment between the axis of the gun and the axis of its discharge tube.

Fifth, to provide a check valve held against opening by a smaller hydraulic force than that corresponding to the pressure of the supply, multiplied by the area of the valve seat.

In the accompanying drawings:

Figure 1 is an axial section, partly in elevation, of a discharge nozzle and nipple, illustrating the first and fifth objects mentioned;

Figure 2 is a central axial section, partly in elevation, of a complete lubricant compressor, illustrating the first four objects above mentioned; and Figure 3 is an enlarged section through the coupling means of Figure 2 and the nipple in connection with which said coupling means is employed.

In the embodiment of the invention selected for illustration in Figure 1, the pistol-like handle 10 receives lubricant under pressure from any suitable source through a conduit 12 and discharges the same into a tube 14. The outer end of the tube 14 carries a packing box 16 which, in turn, carries a gland 18 for compressing a suitable packing 20. The gland 18 is elongated to provide a seat for the slidable discharge nozzle 22 having a central axial opening at 24 and a convex spherical surface at 26 for forming a seal in a manner to be described hereinafter.

Clamped between the inner end of the tube 14 and a shoulder 28 on the handle 10 is a spider 30 forming a rigid support for a spacer rod 32. The valve 34 is threaded in the end of the spacer rod 32 and comprises a stem having a convexly curved main valve portion 36 facing toward the high pressure side of the valve. The inner end of the discharge nozzle 22 is enlarged to define a valve chamber 38 and carries an annular valve seat 40, preferably threaded into the open end of the valve chamber. The inward movement of the valve seat into the chamber is limited by abutment of the flange 42 with the end of the chamber wall. The outer periphery of the flange 42 may be notched, or cut away, as at 44, to increase the area of communication between the outer annular spaces 46 and 48. The extreme inner end of the valve seat is preferably provided with a lip 50 forming, with the flange 42, a suitable seat for the compression spring 52, which spring abuts the spider 30 at its other end.

It will be seen that the valve itself is relatively stationary and that the annular valve seat moves inwardly away from the valve to open an exit passageway. The total pressure tending to eject the movable part of the valve will be the hydraulic pressure of the supply acting over an area equal to the inner cross-section of the gland 18 minus the cross-section of the valve on the line where it makes contact with the seat. This is because the hydraulic pressure on the area inside the valve seat is carried by the spacer rod 32. In the embodiment illustrated the area of the valve seat is only a trifle less than the area of the gland. By making the valve seat and gland of the same cross-section, the sealing force of the hydraulic pressure of the supply might be entirely eliminated if desired. However, I prefer to employ the initial constant bias due to the spring 52 plus a relatively slight increment proportional to the supply of pressure. This results in a valve that will open with relative ease against high pressures, and also retain such pressures without imposing such a load on the contact surfaces of the valve and its seat to result in rapid wear and deterioration.

In discharging relatively large amounts of lubricant against relatively moderate pressures, the resistance of the check valve, or valves, in the system becomes important. I provide a pin 54 mounted in the body of the valve and extending out along the axis of the discharge nozzle. When the valve is closed, the end of this pin is substantially flush with the discharge orifice 24, but when the surface 26 is placed against such a receiving nipple as that shown in Figure 3, the inward telescoping movement of the discharge nozzle necessary to open the valve 36 can only be produced by pushing the pin 54 forward to hold the check valve in the nipple open precisely as shown in Figure 3. Thus, when lubricant is being injected, the hydraulic pressure of the lubricant does not have to push any check valve open but need merely overcome the bearing resistance and the resistance of the passageways to rapid flow on account of the viscosity of the lubricant.

Referring, now, to Figures 2 and 3, I have illustrated supply means for the same type of service, in which the power for compressing the lubricant is developed close to the point of injection, as by the manually operated handle 56. The supply of lubricant is contained in a barrel 58 having a discharge tube 60 at one end terminating in coupling means indicated generally by the reference character 62. The tube 60 is mechanically supported by the end wall 64 of the barrel, as by a base annulus 66, and the clamping nut 68 preferably gripping a washer 70 to provide a tight seal. The manual element for expelling lubricant from the tube, or cylinder, 60 is a rod extending through from the handle 56 and having a large portion 72 slidably guided in the rear end of the barrel, and a smaller portion 74 terminating in a relatively short piston portion 76 which slides in and never quite moves out of the tube 60. I provide two lateral openings 78 for inlet ports, spaced from the end of the tube 60, so that in the retracted position shown the piston 76 is enclosed in a continuous annulus of metal. It is the engagement of the piston 76 with the tube 60 that determines the alignment of the rod.

I provide a housing tube 80, suitably fastened at 82 in the rear end of the barrel. There is also guiding engagement between the front end of the tube 80 and the piston rod 74. I have illustrated an end plug 84 and a hat-shaped sealing leather 86, which leather is held in place by a washer 88 receiving the thrust of the return spring 90. The return spring 90, at its other end, abuts a washer 92 lying against a transverse pin 94 projecting from the rear portion 72 of the piston rod.

In use, the barrel is intended to remain closed permanently, and the cap 96 is, therefore, fastened in place by machine screws 98 which, while they can be removed for repair purposes, will not ordinarily be touched during the filling and emptying of the device.

I provide an annular sealing cup leather 100, reinforced by clamping plates 102, carried by a central sleeve 104 slidable on the housing tube 80. During the emptying of the barrel the withdrawal of the lubricant at 78 will lower the pressure in front of this follower piston and move it forward. In this way the more or less viscous lubricant in the barrel is constrained to move in a body up to and through the opening 78.

The gun is adapted to be filled by complete removal of the coupling 62 and the injection of lubricant under hydraulic pressure through the open end of the discharge tube 60. I have provided an air vent 106 in the side wall of the barrel 58 at a point where it will be fairly uncovered just at the end of the permissible rearward movement of the follower piston. Whenever the piston is nearer the discharge end of the barrel, this air vent, in common with the air vent 108 in the rear end, functions merely to admit air to replace the lubricant withdrawn. However, when the device is being filled, movement of the follower piston to the position of Figure 2 will open the space in front of the piston to the vent 106 so that oil will squirt out. This serves a double purpose. It immediately apprises the operator that the gun is full and should be disconnected from the pressure source; and, by affording a relief outlet not too entirely inadequate compared with the area of the openings 78, it protects the barrel 58 from being exposed by a careless operator to a higher pressure than it can stand.

Referring, now, to Figure 3, the coupling means 62 comprises the rear sleeve 110 and the front sleeve 112 threaded together to support and house all the other parts. In the chamber 114, between the flange 116 forming the valve seat and the shoulder 118 on the front tube 112, I provide, first, a spider 120 overlying the shoulder 118 and held without substantial play by the front end 122 of the sleeve 110; second, the conically coiled spring 124; and third, the ball check valve 126. The pin 128, corresponding to the pin 54 of Figure 1, is now a stationary element projecting at all times past the orifice 24. It is supported in the hub of the spider 120 and fastened in place by a short tube 130. The rear end of the fastening tube is riveted out at 132, and forms an abutment limiting the opening movement of the ball valve 126 so that it can move to a position where the effective clearances for flow around and past it are a maximum, but no farther. I prefer to adjust the check valve 126 to withstand a relatively insignificant pressure only, sufficient to prevent gravity or an external jolt from ejecting the contents of the gun past it when the gun is not in use. In one successful embodiment of the invention this pressure is as low as five pounds per square inch.

The sleeve 112 is preferably screwed onto the sleeve 110 with relatively powerful tools so that these parts cannot be separated by hand. This makes both sleeves a unitary assembly that can be threaded onto the discharge tube 60 or removed therefrom quickly and easily by hand. However, if the coupling member itself should need adjustment or repair, the separation of the sleeves lets all the elements of the combination fall apart.

The nipple I have illustrated for co-operation with the coupling means of Figures 1 and 2 comprises the usual tubular body 134 threaded at 136 for screwing it into an orifice in the part to be lubricated, and having a valve seat at 138 and a conical flaring portion 140 for receiving the spherical coupling end and forming a metal to metal lubricant-tight seal that will also permit a limited amount of universal swiveling movement between the parts while maintaining the seal. The check valve 142 in the nipple must be held on its seat by the spring 144 with sufficient pressure to prevent leakage of lubricant during use of the machine to which the nipple is to be attached. For practical purposes the necessary pressure here represents a much higher hydraulic pressure than that necessary to open the check valve 126. However, when the nipple is employed in connection with coupling means according to Figure 1 or Figure 2, the pin will mechanically push this valve open so that the relatively high hydraulic pressure necessary to do this need not be developed and the power necessarily wasted in doing so is saved.

Without further elaboration, the foregoing will so fully explain the gist of my invention that others may, by applying current knowledge, readily adapt the same for use under various conditions of service without eliminating certain features which may properly be said to constitute the essential items of novelty involved, which items are intended to be defined and secured to me by the following claims.

I claim:

1. Lubricating means comprising a thrust operated grease gun, a receiving element, cooperating terminal portions carried by said gun and element for forming a lubricant tight universal joint seal when said gun is pressed against said element, a check valve in said element, and a projection, carried by said gun and independent of the terminal portion thereof, said projection extending through said seal, for opening said valve mechanically for the injection of lubricant.

2. Lubricating means comprising a thrust operated grease gun, a receiving element, cooperating metallic terminal portions carried by said gun and element for forming a lubricant tight universal joint seal when said gun is pressed against said element, a check valve in said element, an axial projection carried by said gun and projecting centrally through said seal for opening said valve mechanically for the injection of lubricant, said seal and projection having a discharge opening in the form of a complete annulus, and means for advancing the projection relative to the terminal portion of the gun.

3. Lubricating means comprising a receiving element, a discharge nozzle comprising relatively telescoping parts movable by thrusting said nozzle downwardly against said element, and a hydraulically counterbalanced check valve in said nozzle actuated in a path in substantial axial alignment with the element by the telescoping movement of the nozzle parts.

4. Lubricating means comprising a receiving element, a discharge nozzle comprising relatively telescoping parts movable by thrusting said nozzle downwardly against said element, a hydraulically counterbalanced check valve in said nozzle actuated in a path in substantial axial alignment with the element by the telescoping movement of the nozzle parts, and a biasing spring tending to hold said check valve closed, the counterbalance being not quite complete to leave a small residual pressure effect also tending to close the valve.

5. Lubricating means comprising a thrust operated grease gun, a receiving element, cooperating terminal portions carried by said gun and element for forming a lubricant tight seal when said gun is pressed against said element in the direction of said thrust, a check valve in said element, a projection carried by said gun and projecting through said seal for opening said valve mechanically for the injection of lubricant, and means for advancing the projection relatively to said terminal portion.

6. Lubricating means comprising a grease gun, a receiving element, cooperating metallic terminal portions carried by said gun and element for forming a lubricant tight universal joint seal when said gun is pressed against said element, a check valve in said element, a projection carried by said gun for opening said valve mechanically for the injection of lubricant, and means to advance said projection relative to the terminal portion of the gun.

7. A tool for use in high pressure lubricating systems, said tool having a lubricant supply passage and comprising an outer member for attachment to the lubricant supply line and an inner member for engagement with the part to be lubricated, said inner member telescoping within the outer member, spring means yieldingly holding the members extended, a valve carried by the outer member for opening and closing the said passage, said valve being normally closed, said inner member having means which, when the members are manually contracted, opens the passage.

8. A tool for use in high pressure lubricating systems, said tool having a lubricant supply passage and comprising an outer member for attachment to the lubricant supply line and an inner member for engagement with the part to be lubricated, said inner member telescoping within the outer member, spring means yieldingly holding the members extended, a valve carried by the outer member for opening and closing the said passage, the said valve being assisted in closing by lubricant pressure, said inner member having means which, when the members are manually contracted, opens the passage.

9. A tool for connecting a high pressure lubricant supply line with a lubricant receiving fitting, comprising normally extended outer and inner telescoping members having a lubricant supply passage, a normally closed valve for said passage, said inner member having means which, when the members are manually contracted, opens the passage, means carried by the inner member for making a substantially lubricant tight connection with the lubricant receiving fitting by pressure only, and means carried by the outer member whereby pressure may be applied on the lubricant receiving fitting.

10. A tool for connecting a high pressure lubricant supply line with a lubricant receiving fitting, comprising normally extended outer and inner telescoping members having a lubricant supply passage, a normally closed valve for said passage, said inner member having means which, when the members are manually contracted, opens the passage, a valve nozzle carried by the inner member for making a substantially lubricant tight connection with the lubricant receiving fitting by pressure only, and means carried by the outer member whereby pressure may be applied to contract the members for opening the valve and to make a lubricant tight connection between the valve nozzle and the lubricant receiving fitting.

11. A tool for connecting a high pressure lubricant supply line with a lubricant receiving fitting, consisting of an outer hollow member and an inner telescoping member having a passage therethrough, a valve carried by the outer member for controlling the flow of lubricant to said passage in the inner member, said inner member having means which, when the members are manually contracted, opens the passage, means carried by the inner member for making a substantially lubricant tight connection with the lubricant receiving fitting by pressure only, and means carried by the outer member whereby pressure may be applied to said lubricant receiving fitting.

12. A tool for connecting a high pressure lubricant supply line with a lubricant receiving fitting, consisting of an outer hollow member and an inner telescoping member having a passage therethrough, a valve carried by the outer member for controlling the flow of lubricant to said passage in the inner member, said inner member having means which, when the members are manually contracted, opens the passage, a valve nozzle carried by the inner member for making a substantially lubricant tight connection with the lubricant receiving fitting by pressure only, and a handle carried by said outer member whereby pressure may be applied on said lubricant receiving fitting.

In witness whereof, I hereunto subscribe my name this 31st day of July, 1926.

ERNEST W. DAVIS.